United States Patent [19]

Bergsoe

[11] 4,340,421
[45] Jul. 20, 1982

[54] METHOD OF RECOVERING LEAD FROM LEAD-ACID BATTERIES

[75] Inventor: Svend Bergsoe, Glostrup, Denmark
[73] Assignee: Paul Bergsoe and Son A/S, Denmark
[21] Appl. No.: 195,435
[22] Filed: Oct. 9, 1980
[51] Int. Cl.³ .......................... C22B 7/02; C22B 13/00
[52] U.S. Cl. ............................................ 75/25; 75/77; 429/49
[58] Field of Search ................... 75/77, 25, 3, 93 DA; 266/157, 195, 205; 429/49

[56] References Cited

U.S. PATENT DOCUMENTS

| | | | |
|---|---|---|---|
| 2,242,219 | 5/1941 | Baily | 75/26 X |
| 2,826,490 | 3/1958 | Neumann | 75/77 |
| 3,243,283 | 3/1966 | Lumsden | 75/77 |
| 4,013,456 | 3/1977 | Bergsoe | 75/77 |
| 4,058,396 | 11/1977 | Birk | 75/77 |

Primary Examiner—Anthony Skapars
Attorney, Agent, or Firm—Harvey B. Jacobson

[57] ABSTRACT

A process for recovering lead from scrap lead-acid batteries comprises smelting whole unbroken batteries in a blast furnace having a configuration which minimizes the amounts of flue dust produced. The volatile organic material produced by the combustion of the battery cases and separators and entrained in the furnace exhaust gases are ducted to an after-burner and burned to carbon dioxide while any sulfur dioxide gas combines with metal oxides to form solid metal sulphate including lead sulphate particles which can be collected and recycled into the furnace for further lead recovery. The blast furnace utilized in the lead recovery process is characterized by its wide shaft causing gases to rise at a low velocity, thus enabling a longer time for hot reducing gases generated in the smelting zone to contact and give up heat to the descending charge of scrap batteries, resulting in the maintenance of a cold furnace top. Most of the volatilized lead recondenses on the cold charge, reducing significantly the amount of lead-containing flue dust. Flue dust which is formed during smelting may be collected, and melted, to form an agglomerated product which can be introduced back into the blast furnace.

11 Claims, 1 Drawing Figure

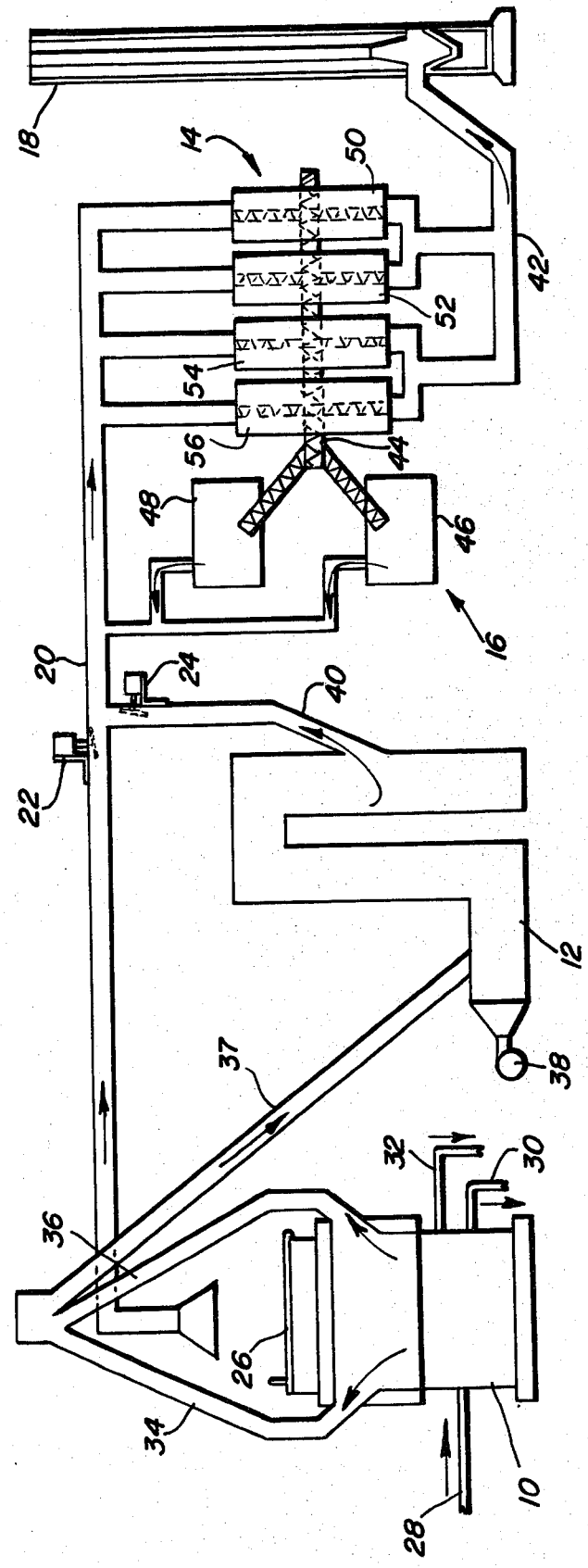

METHOD OF RECOVERING LEAD FROM LEAD-ACID BATTERIES

BACKGROUND OF THE INVENTION

1. Field of the Invention

This invention relates to the recovery of metallic lead from scrap lead-acid batteries such as those which are discarded from automobiles. More particularly, the present invention provides for the smelting of unbroken scrap batteries in a blast furnace of such unique design that the separation and recovery of the lead and lead-bearing materials can be accomplished economically and yet meet all pollution requirements for both air and water.

2. Disclosure Statement

The substantial cost of lead and the problems of disposal of waste lead makes recovery of lead from scrap batteries of significant economical importance. Worldwide, millions of tons of scrap batteries are produced annually. Consequently, the lead industry could save hundreds of millions of dollars per annum if a dependable lead recovery process existed.

Hitherto, it has been necessary to remove the battery case which is constructed from rubber, plastic or asphaltic material from the battery by one means or another, before attempting to recover the lead contained within the battery. Typically, such decasing processes included draining the acid from the battery, breaking the remaining unit as a whole, and then hand sorting the casing material from the lead containing materials. Breaking batteries by hand is a dangerous job inasmuch as unavoidable splashes of lead sulphate sludge on clothes, hands and face invariably result. The acid which is drained from the battery has been previously emptied into the earth, poured down the drain or stored, which presents unacceptable environmental problems. Mechanized procedures for crushing the batteries and separating the casing materials from the lead-containing materials require heavy equipment, a lengthy operation, and are necessarily very expensive. Furthermore, the methods of removing the casing from the battery produces a toxic lead contaminated case material which, if discarded, poses a substantial health hazard. Processes for recovery of lead from waste batteries are disclosed in U.S. Pat. Nos. 3,393,876 and 4,118,219, issued to M. E. Elmore, which attempt to improve on prior recovery processes involving separating the battery case from the lead-containing battery components. These patents utilize a crushing step and a flotation step for separation of the battery components.

It has been proposed to recover lead from scrap batteries by burning the battery cases and utilizing the heat so released to melt the metallic lead components of the batteries. Previous attempts, however, have proven unsuccessful because the battery cases are made principally of organic materials and their burning results in the production of excessive smoke and a highly polluted atmosphere. In an attempt to solve this problem, U.S. Pat. No. 2,826,490, issued to Newmann, discloses utilizing the excess heat formed by the combustible materials in the battery cases to melt the contained metallic lead and maintain the collected molten lead in a liquid state until conveyed to suitable molds or otherwise disposed of. This patent utilizes a furnace construction adapted to receive discarded and drained storage batteries and provides a combustion chamber with means therein to project turbulent air onto the battery cases as they burn. The batteries are supported on a grate or rail structure through which the melted lead drips onto a collecting pan. U.S. Pat. No. 4,058,396 mentions that prior art processes have employed introducing complete batteries into a furnace and removing the molten lead, while employing an after-burner to burn off volatile organic products from the battery cases and separators. The patentee states that such a process produces hazardous by-products and therefore proposes to recover lead from batteries by contacting comminuted batteries with a molten alkali metal salt.

A need, therefore, exists for recovering lead from scrap batteries in a cost effective manner which minimizes environmental pollution hazards and the formation of toxic waste.

SUMMARY OF THE INVENTION

In accordance with the present invention, the recovery of lead from scrap batteries comprises smelting the entire battery, including the organic case and lead-containing components, in a shaft furnace to form the molten lead which is recovered without the production of a large output of flue dust, and further includes employing an after-burner to burn the volatile organic products formed during the combustion of the battery cases and separators. The flue dust produced, which includes lead sulphate, is collected and recycled for further smelting in the furnace. The shaft furnace utilized in the recovery process is characterized by its wide shaft causing the produced gases to rise at a low velocity, thus, providing a longer time for the hot gases generated in the smelting zone to contact and give up heat to the descending charge, resulting in the maintenance of a cold area at the top of the furnace. The cold area at the top of the furnace enables the condensation of any volatilized lead, thus, greatly reducing the output of flue dust. To prevent atmospheric pollution by sulfur dioxide, iron either in the form of metallic scrap iron or as mill scale is added to combine chemically with the sulfur as iron sulphide. The furnace off-gas nevertheless contains some sulfur dioxide that reacts with lead and other metal oxides in the after-burner to form solid sulphate particles that precipitate with the flue dust, thus further reducing the atmospheric pollution. A complete ventilation system around the shaft furnace is provided to prevent any lead fumes from escaping into the working area. Ventilation air is utilized to cool down the hot gases leaving the after-burner. The mixed gases are filtered to remove the entrained solids which can then be recycled into the smelting zone. Combined, the blast furnace of the present invention and operation itself, along with the after-burner, use of ventilation air and preferred recycling of agglomerated flue dust, allows the smelting of unbroken batteries for the recovery of the lead content to proceed under full environmental and occupational health control.

Accordingly, it is an object of the present invention to provide a process for the recovery of lead from scrap batteries in a manner which minimizes capital and operating expenses and is able to meet strict environmental and occupational safety standards.

Another object of the present invention is to recover lead from scrap batteries and avoid the decasing operation.

Still another object of the present invention is to recover lead from scrap batteries by smelting whole unbroken batteries in a shaft furnace designed to minimize the production of lead-containing particulates in the furnace exhaust gases.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWING

The sole FIGURE is a schematic illustration of the apparatus utilized in the process in accordance with the present invention in which the blast furnace, afterburner, flue dust filters and agglomeration furnace for the flue dust is shown, the arrows representing the movement of process materials.

DETAILED DESCRIPTION OF THE INVENTION

The apparatus shown in the FIGURE includes shaft furnace 10 in which the unbroken batteries are smelted and the molten lead recovered, after-burner 12 wherein the volatile organic materials formed during the combustion of the battery cases and separators are burned to carbon dioxide, filter area 14 which separates the flue dust from the gases, agglomerator 16 which agglomerates the flue dust for recycling into furnace 10 and flue 18 which carries the clean gases for discharge into the atmosphere. A complete ventilation system around the furnace prevents any lead fumes from escaping into the working area. The various ventilation ducts are combined into one large ventilation duct 20 in which cooler ventilation air is mixed with the hot gases from afterburner 12 by mixing valves 22 and 24 preceding the filtering step.

Furnace 10 is a blast furnace characterized by its wide shaft causing the gases formed in the smelting zone to rise at a low velocity. The low velocity gas rise enables the hot gases to contact the descending charge of batteries for long periods of time, allowing the gases to cool with the result that a cold top can be maintained in the furnace. Advantageously, the bulk of any lead which is volatilized in the smelting zone has time and large amounts of cold surfaces on which it can condense, thereby greatly reducing the output of flue dust. To obtain the low output of flue dust, approximately 2–3% by weight of furnace charge, the ratio of cubic meters per hour of air (measured at standard temperature and pressure) entering into the furnace: shaft area in square meters, preferably does not exceed 1000.

To provide a compact smelting zone, and uniform smelting, the combustion air entering the furnace is preheated to a temperature of at least 200° C. and preferably to 500° C. Preheated air has been used in the steel smelting industry as disclosed in U.S. Pat. No. 2,242,219, but the use of preheated air has not previously been used in the secondary lead industry. To further raise the temperature in the smelting zone, air supplied to the furnace can be enriched with oxygen.

Furnace 10 includes top 26 which opens for the charging of the furnace. Heated air enters through duct 28 while recovered lead and slag is tapped from the furnace at lines 30 and 32, respectively. Organic volatile compounds formed by the combustion of the battery cases and separators and flue dust leave the furnace entrained in the furnace exhaust gases through steeply rising flues 34 and 36 placed on the sides of furnace 10 and enter after-burner 12 through duct 37.

After-burner 12 insures that the volatile organic materials entrained in the furnace exhaust gases are not discharged to the atmosphere. The after-burner, maintained at a minimum temperature of 800° C. burns the organic volatile material, given a minimum residence time of 0.5 seconds in after-burner 12 to carbon dioxide. After-burner 12 is oil or gas fired by means of burner 38. Gases leaving after-burner 12 through duct 40 are mixed with cooler ventilation air in ventilation duct 20 and ducted to filter area 14 whereupon the flue dust is separated from the exhaust gases. The cleaned gases leave filter area 14 through duct 42 and out through flue 18 into the atmosphere.

The flue dust which is separated from the exhaust gases in filter area 14, a conventional gas cleaning device or baghouse, is continuously conveyed by means of screw conveyor 44 to agglomerator 16 operated in accordance with U.S. Pat. No. 4,013,456, issued to the inventor. Agglomerator 16 pretreats the flue dust prior to reintroduction into furnace 10. The flue dust coming from filter area 14 is exceedingly fine-grained, and only an agglomeration into larger particles can reduce the reformation of dust during the subsequent smelting in the furnace. When heated, the flue dust starts to get sticky and subsequently it becomes fluid at a temperature which depends on its composition, particularly the impurities contained therein. When the molten material is cooled, solidified blocks are obtained which do not give rise to the problem of increased flue dust formation. In accordance with the method disclosed in U.S. Pat. No. 4,013,456, slag-forming chemicals, such a borax and/or sodium carbonate are added to the flue dust. In a second embodiment of the method according to the patent, there is added before, during or after the fusion of the flue dust, a material raising the melting point, e.g. lime. By this means, the melting temperature of the mass of dust is increased in order to avoid melting of the solidified blocks of material during the subsequent treatment in the shaft furnace, before they have reached the smelting zone of the shaft furnace. In this way, the melting of the agglomerated flue dust in the upper part of the shaft is avoided and prevents the formation of a blanket which obstructs the passage of air through the furnace. In a preferred embodiment of the method according to the patent, a ferrous reduction agent in the form of pyrite cinder, iron oxide, iron scale or iron filings or or a mixture of two or more of these reagents is added to the fused flue dust. The melting temperature of the mass of dust is increased to avoid the melting of the agglomerated dust before having reached the smelting zone of the shaft furnace. The addition of iron makes the solidified mass harder and better suited for charging and furnace treatment, and at the same time the iron serves to combine with sulfur and other impurities during the subsequent reduction process in the furnace. The flue dust is melted in hearths 46 and 48 of agglomerator 16, cooled and then recycled with the battery charge into the shaft of furnace 10.

The charge for furnace 10 consists essentially of whole unbroken batteries which preferably have been treated only for the removal of spent acid. The battery cases are left intact, reducing equipment costs for crushing and separating the battery components and eliminating a very hazardous procedure as described in the preceding introduction. The smelting charge also includes a variety of other lead residues such as the recycled agglomerated flue dust to which is added coke, fluxes and returned slag. To prevent atmospheric pollution by sulfur dioxide, iron either in the form of metallic scrap iron or as mill scale is added at the minimum rate of 60 kilograms per metric ton of charge in order to combine chemically with the sulfur as iron sulphide. Iron contained in the agglomerated flue dust also reduces the sulfur dioxide pollution.

OPERATION

A smelting charge is prepared using whole, unbroken batteries together with a variety of other lead residues, to which is added coke, fluxes, returned slag and iron. This material is then charged by a suitable means through top 26 into the shaft of furnace 10. The coke contained in the charge burns in the preheated air which has been supplied through duct 28 to the base of the furnace and supplies the heat and reducing conditions necessary for converting compounds of lead contained within the batteries and other lead residues into molten metallic lead. The iron combines with the sulfur present in the feed to form a molten matte while the fluxes react with other waste materials and are converted into a liquid slag. The molten metallic lead and liquid matte and slag are tapped from the base of the furnace at lines 30 and 32, respectively, into molds where the liquid solidifies. The consumption of coke can be reduced considerably due to the energy derived from the combustion of the battery cases.

The hot gases generated in the base of the furnace rise slowly in the shaft counter-current to the smelting charge which takes several hours to reach the smelting zone after it has been charged into the top of the furnace. The low velocity of the rising gases is due to the volume of air to shaft area ratio, which should not exceed 1000. The low velocity gas heats up the materials in the charge and at the same time is cooled down to maintain a relatively cool furnace top which enables the condensation of any lead which has been volatilized in the smelting zone, reducing the output of flue dust to 2-3% by weight of the furnace charge. This is a drastic reduction from the 10-12% flue dust formation produced in prior art systems. Organic materials, such as the battery cases and separators are converted into volatile compounds by the action of the heat and leave furnace 10 entrained in the furnace exhaust gas via steeply rising flues 34 and 36 on the sides of the furnace. Flues 34 and 36 are placed at such a steep angle to eliminate the accumulation of dust or particles of solids on the inside of the flues. Being on such a steep incline, any solids which contact the sides of the flues fall directly back out the flue to the top of the furnace before accumulating on the sides. The build up of solids can shut down the furnace for periodic cleaning and therefore the incline of flues 34 and 36 is an important feature of the layout of the process to avoid shutdown of the recovery system.

The exhaust gases from the flues are ducted down into after-burner 12 which is maintained at a minimum temperature of 800° C. All of the volatile organic compounds are burned in after-burner 12 to harmless carbon dioxide, and at the same time, sulfur dioxide gas is reacted with any metal oxides to form metal sulphates which become collected in fabric filters 50, 52, 54 and 56 of filter area 14. The gases leave after-burner 12 after combustion has been completed at approximately 400° C.

A complete ventilation system around the furnace is provided to prevent lead fumes from escaping into the working area. The various ventilation air ducts are combined into one large ventilation duct 20. The ventilation air is cold and needs filtration, so it is utilized to cool down the hotter gases leaving after-burner 12 by conveying and mixing the hot gases leaving after-burner 12 with the ventilation air in ventilation duct 20 by means of mixing valves 22 and 24 which regulate the amount of exhaust gas entering ventilation duct 20. The mixed gases are filtered through filtering area 14 which includes aforementioned fabric filters 50, 52, 54 and 56 to remove the entrained solids, after which the cleaned effluent gases pass up flue 18 to the atmosphere. A sampling point in flue 18 can be added to provide a continuous sample to instruments measuring the solids content, sulfur dioxide content, temperature and the total volume of gases passing up flue 18, the results being recorded continuously.

The solids filtered from the exhaust gases are very fine in particle size and contain 50-60% lead, making the dust an extremely hazardous material to handle. The dust is therefore conveyed in totally enclosed screw conveyors 44 which charge the dust into flash agglomeration furnaces 46 and 48 of agglomerator 16. The flue dust is melted continuously to give a liquid which is drained by gravity into large cast-iron molds. Various additives can be included in the flue dust during the agglomeration in accordance with the teachings of the aforementioned U.S. Pat. No. 4,013,456. After solidification, the molds are emptied to give a lump product free from dust, which can be recharged back into furnace 10 for recovery of its lead content.

The lead recovery process in accordance with the teachings of the present invention permits the smelting of discarded whole batteries without emitting from the recovery plant excess quantities of sulfur, lead and other particulate matter. The breaking and handling of batteries which has been a major expense in prior art recovery systems and a hazard to the workers has been completely eliminated. By utilizing a shaft furnace which has a large shaft area and permits only a low velocity gas rise, drastically reduced amounts of flue dust are produced enabling the recovery system of the present inventor to operate at ambient air standards well below standards set by government agencies.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A process for recovering lead from scrap batteries comprising; inserting a charge containing whole unbroken batteries into a blast furnace, said blast furnace containing a smelting zone to produce molten metallic lead, said charge descending into said smelting zone, introducing air into said furnace for maintaining combustion within said smelting zone, said furnace being characterized such that the ratio of cubic meters per hour of air, measured at standard temperature and pressure, entering the furnace to the shaft area in square meters does not exceed about 1000, whereby gases formed during the combustion in the smelting zone rise slowly countercurrent with said charge to provide a long contact time between said gases and the descending charge, causing the heated gases to lose heat and form at the top of the furnace a cool temperature area sufficient to condense substantial quantities of lead which has been volatilized, reducing the output of flue dust to about 2–3% by weight of said charge, said charge further including iron containing material, the amount of said iron containing material being adjusted to the sulfur content of the total charge so that said iron reacts with sulfur compounds to form iron sulphide matte.

2. The process of claim 1 wherein said furnace includes a pair of steeply rising flues at the side of said furnace, said steeply rising flues preventing any accumulation of solid matter from being retained on the inside surfaces of said flues, said process further comprising conveying said combustion gases containing therein volatile organic gases formed from the combustion of the battery cases through said flues to an after-burner, said gases being given a residence time of at least 0.5 seconds in said after-burner, said after-burner being maintained at a minimum temperature of 800° C. to burn said organic volatile gases to carbon dioxide.

3. The process of claim 1 wherein said charge further includes lead residues and coke, and wherein sulfur escaping as sulfur dioxide in the furnace gases reacts with metal oxide particles in the after-burner to form sulfates that can be removed from the gases by filtration.

4. The process of claim 1 wherein said iron containing material is added at a rate of at least about 60 kilograms per metric ton of charge.

5. The process of claim 2 further comprising, conveying said combustion gases and flue dust from said after-burner to a filtering area wherein the flue dust is separated from said gases, said filtered gases being exhausted to the atmosphere.

6. The process of claim 5 wherein said flue dust contains about 50–60% by weight lead.

7. The process of claim 5 wherein said combustion gases and flue dust conveyed to said filters are mixed with ventilation air prior to reaching said filters.

8. The process of claim 7 wherein said ventilation air removes lead fumes from the working area and is conveyed to a single duct, said ventilation air and said flue dust and said combustion gases from said after-burner are mixed in said duct.

9. The process of claim 8 wherein said flue dust separated by said filters from said combustion gas is melted and formed into an agglomerated product having a particle size greater than said flue dust, said agglomerated product being reintroduced into said furnace.

10. The process of claim 1 wherein said air introduced into the furnace is preheated to at least 200° C.

11. The process of claim 1 wherein said air introduced into the furnace is preheated to about 500° C.

* * * * *